(12) United States Patent
Kim et al.

(10) Patent No.: US 10,917,841 B2
(45) Date of Patent: Feb. 9, 2021

(54) METHOD FOR SELECTING SERVING MME OF REMOTE UE AND TRANSMITTING NAS MESSAGE IN WIRELESS COMMUNICATION SYSTEM, AND APPARATUS FOR SAID METHOD

(71) Applicant: LG ELECTRONICS INC., Seoul (KR)

(72) Inventors: Laeyoung Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/495,817

(22) PCT Filed: Mar. 19, 2018

(86) PCT No.: PCT/KR2018/003167
§ 371 (c)(1),
(2) Date: Sep. 19, 2019

(87) PCT Pub. No.: WO2018/174492
PCT Pub. Date: Sep. 27, 2018

(65) Prior Publication Data
US 2020/0100174 A1 Mar. 26, 2020

Related U.S. Application Data

(60) Provisional application No. 62/473,486, filed on Mar. 20, 2017.

(51) Int. Cl.
*H04W 48/18* (2009.01)
*H04W 76/25* (2018.01)
(Continued)

(52) U.S. Cl.
CPC ............. *H04W 48/18* (2013.01); *H04W 8/08* (2013.01); *H04W 8/20* (2013.01); *H04W 60/00* (2013.01);
(Continued)

(58) Field of Classification Search
None
See application file for complete search history.

(56) References Cited

U.S. PATENT DOCUMENTS 9,877,263 B1 * 1/2018 Oroskar .................. H04W 4/06
9,913,242 B1 * 3/2018 Saleh ........................ H04B 7/14
(Continued)

FOREIGN PATENT DOCUMENTS

WO 2015009070 1/2015

OTHER PUBLICATIONS

PCT International Application No. PCT/KR2018/003167, Written Opinion of the International Searching Authority dated Jul. 10, 2018, 15 pages.
(Continued)

*Primary Examiner* — Jutai Kao
(74) *Attorney, Agent, or Firm* — Lee, Hong, Degerman, Kang & Waimey

(57) ABSTRACT

Provided is a method for selecting a serving mobility management entity (MME) and transmitting a non-access stratum (NAS) message, the method according to one embodiment of the present invention, with respect to an eNB selecting a serving MME of a remote user equipment (UE) and transmitting an NAS message in a wireless communication system, comprising the steps of: the eNB receiving an attach request of the remote UE; the eNB selecting a serving MME of the remote UE; and the eNB transmitting the attach request to the selected MME, wherein, on the basis of one or more from among the identification data of a relay UE,
(Continued)

data indicating that the attach request is transmitted by means of the relay UE, or data indicating that the selected PLMN data of the remote UE is not available, the eNB selects a PLMN of the relay UE as the PLMN of the remote UE.

12 Claims, 12 Drawing Sheets

(51) Int. Cl.
    *H04W 76/11* (2018.01)
    *H04W 8/08* (2009.01)
    *H04W 60/00* (2009.01)
    *H04W 8/20* (2009.01)
    *H04W 88/04* (2009.01)
    *H04W 84/04* (2009.01)
(52) U.S. Cl.
    CPC ............ *H04W 76/11* (2018.02); *H04W 76/25* (2018.02); *H04W 88/04* (2013.01); *H04W 84/042* (2013.01)

(56) References Cited

U.S. PATENT DOCUMENTS

| | | |
|---|---|---|
| 2005/0058096 A1 | 3/2005 | Cheng |
| 2013/0163504 A1* | 6/2013 | Jia .......................... H04W 60/00 370/315 |
| 2014/0023016 A1 | 1/2014 | Mildh et al. |
| 2014/0286314 A1 | 9/2014 | Xu et al. |
| 2018/0020442 A1* | 1/2018 | Nair ........................ H04L 5/003 |

OTHER PUBLICATIONS

Qualcomm, "Optimisation of network selection in case of an operator supporting only a subset of specific access technologies", 3GPP TSG SA WG1 Meeting #77, S1-171246, Feb. 2017, 3 pages.

* cited by examiner

Scenario 1 : OOC and connected to relay

Scenario 2 : OOC and no connected to relay

Scenario 3 : In coverage and no connection to relay

Scenario 4 : In coverage and connected to relay

METHOD FOR SELECTING SERVING MME OF REMOTE UE AND TRANSMITTING NAS MESSAGE IN WIRELESS COMMUNICATION SYSTEM, AND APPARATUS FOR SAID METHOD

CROSS-REFERENCE TO RELATED APPLICATIONS

This application is the National Stage filing under 35 U.S.C. 371 of International Application No. PCT/KR2018/003167, filed on Mar. 19, 2018, which claims the benefit of U.S. Provisional Application No. 62/473,486, filed on Mar. 20, 2017, the contents of which are all hereby incorporated by reference herein in their entirety.

TECHNICAL FIELD

The following description relates to a wireless communication system, and more particularly, to a method and apparatus for selecting a serving Mobility Management Entity (MME) of a remote User Equipment (UE) and sending a Non-Access Stratum (NAS) message.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE OF THE INVENTION

Technical Task

The technical task of the present invention is to provide a method of selecting and managing a PLMN to efficiently manage the PLMN in case that a remote UE and a relay UE exist.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of selecting a serving Mobility Management Entity (MME) of a remote User Equipment (UE) and sending a Non-Access Stratum (NAS) message by an eNB in a wireless communication system, the method including receiving an attach request of the remote UE by the eNB, selecting the serving MME of the remote UE by the eNB, and sending an attach request to the selected MME by the eNB, wherein the eNB selects a Public Land Mobile Network (PLMN) of a relay UE as a PLMN of the remote UE based on at least one of identifier information of the relay UE, information indicating that the attach request is sent via the relay UE and information indicating that there is no selected PLMN information of the remote UE.

In another technical aspect of the present invention, provided herein is an eNB device in selecting a serving Mobility Management Entity (MME) of a remote User Equipment (UE) and sending a Non-Access Stratum (NAS) message in a wireless communication system, the eNB device including a transceiver and a processor configured to receive an attach request of the remote UE and select the serving MME of the remote UE, wherein the eNB sends an attach request to the selected MME and wherein the eNB selects a PLMN of a relay UE as a PLMN of the remote UE based on at least one of identifier information of the relay UE, information indicating that the attach request is sent via the relay UE and information indicating that there is no selected PLMN information of the remote UE.

The attach request may be forwarded to the eNB via the relay UE.

If a serving PLMN of the remote UE is different from a serving PLMN of the relay UE, the attach request may be sent by the remote UE.

The attach request sent to the relay UE by the remote UE may include identifier information of the remote UE.

The attach request may include the identifier information of the relay UE or the information indicating that the attach request is sent via the relay UE.

If the remote UE does not perform an attach by being directly connected to a network previously, the attach request may be sent by the remote UE.

Advantageous Effects

According to the present invention, it is able to solve a related art problem that traffic is not delivered to a relay UE in an RRC connected state for a remote UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE FOR INVENTION

Figure 1:
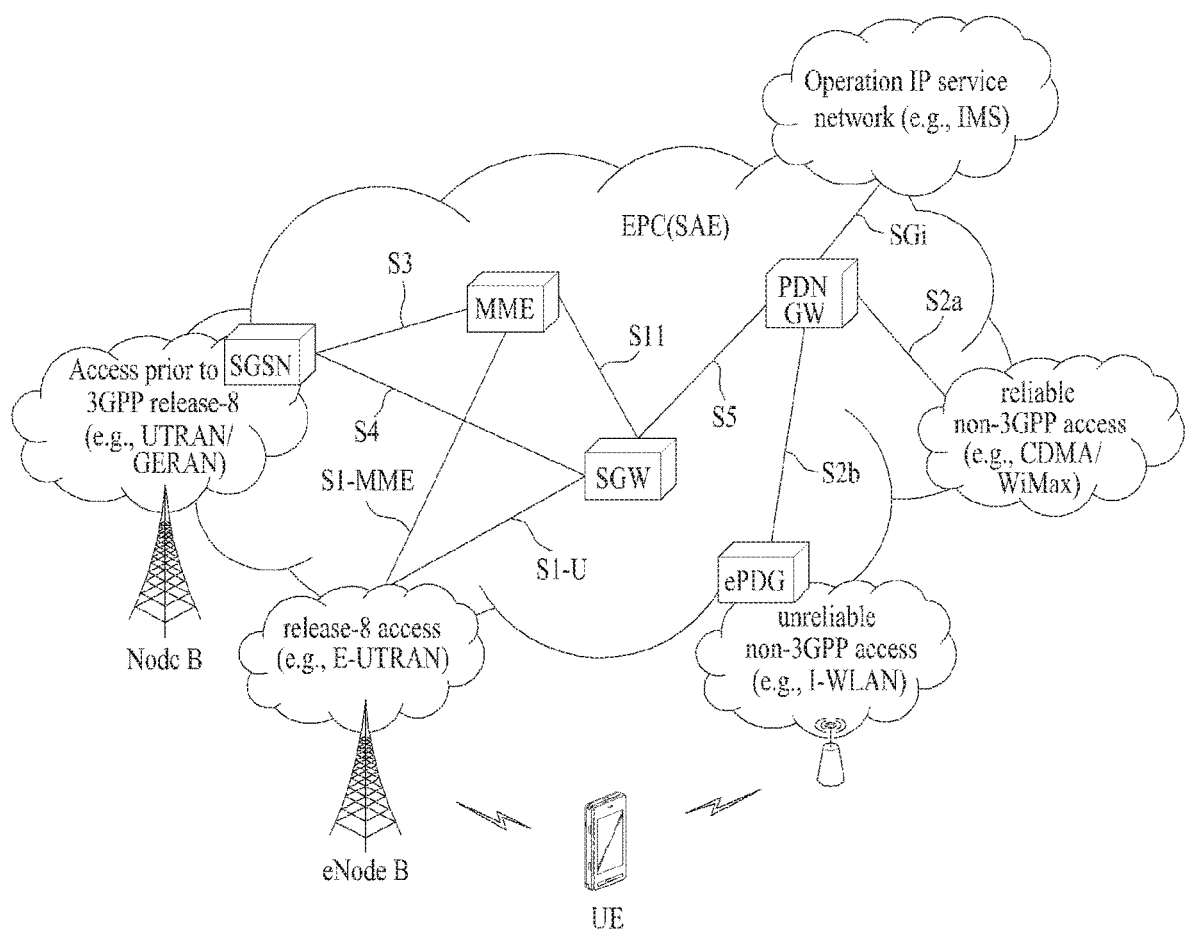
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
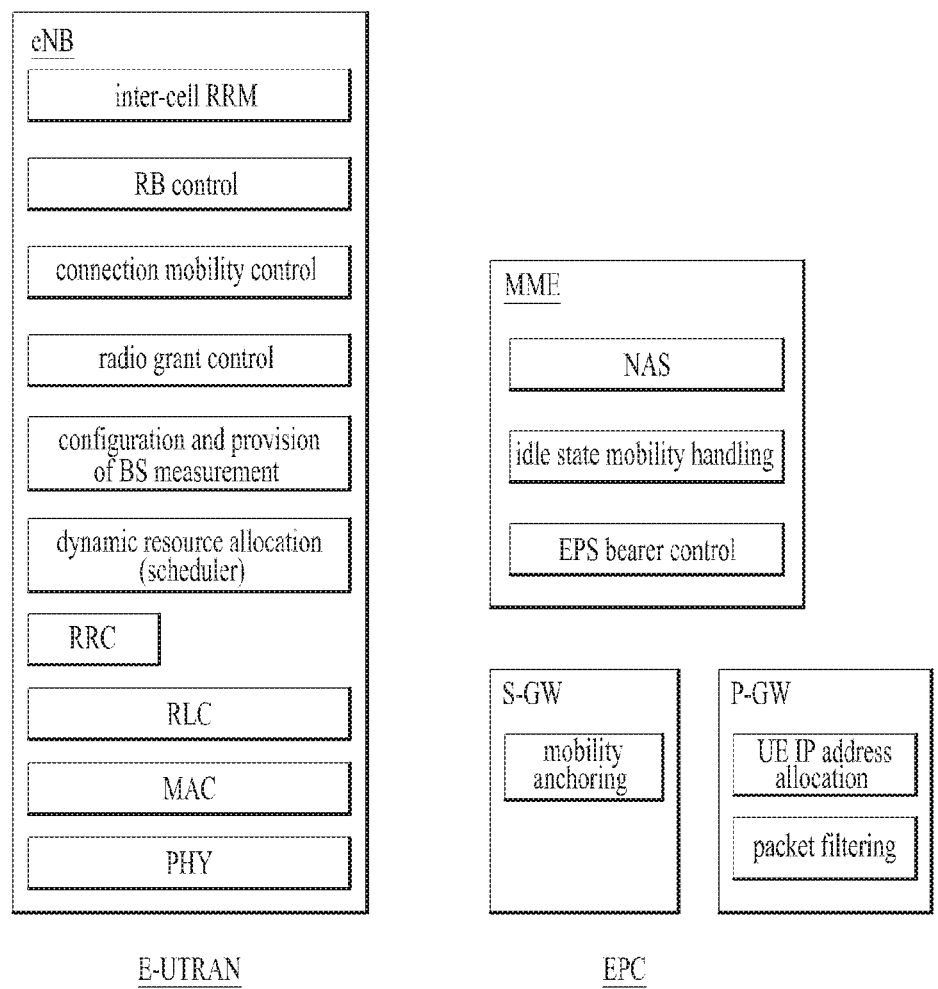
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
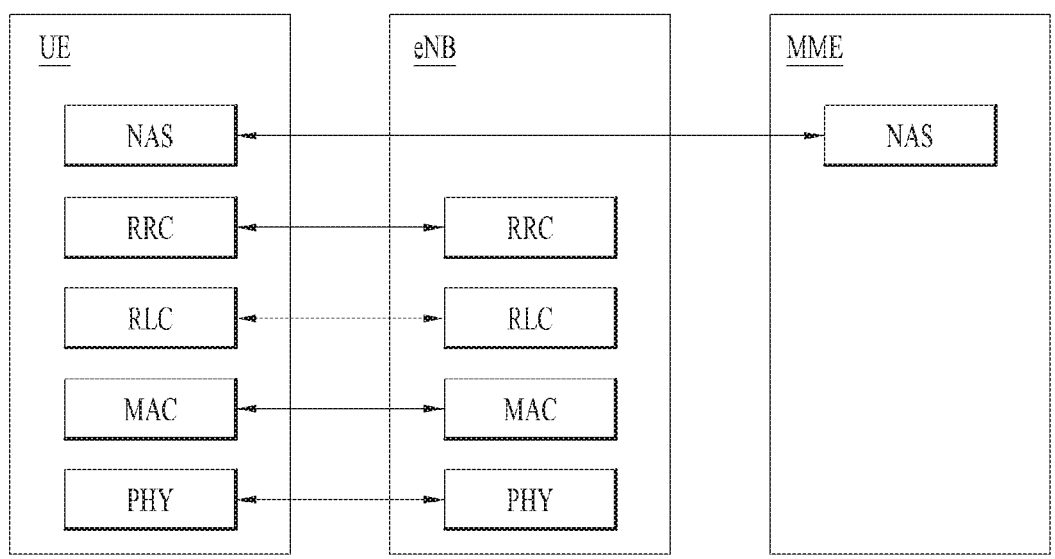
FIG. 3 is a diagram illustrating the structure of a radio interface protocol in a control plane.
Figure 4:
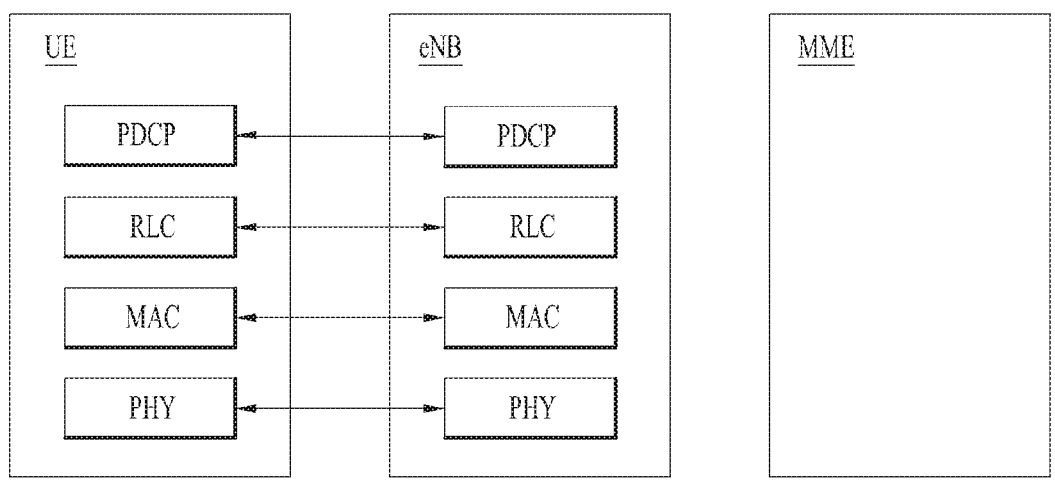
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
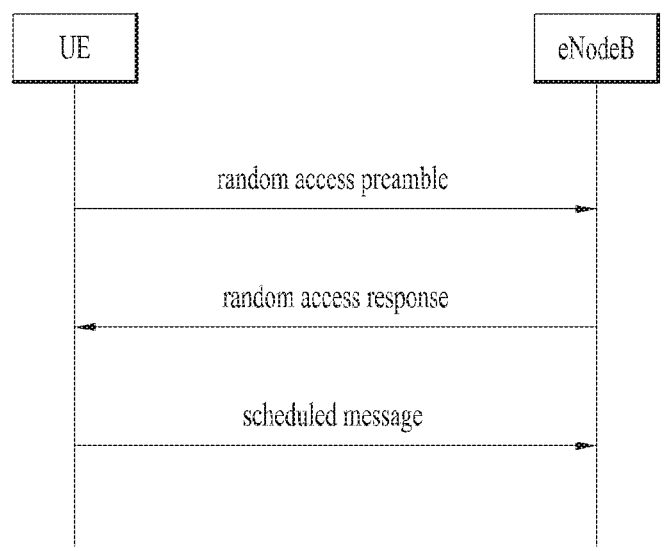
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
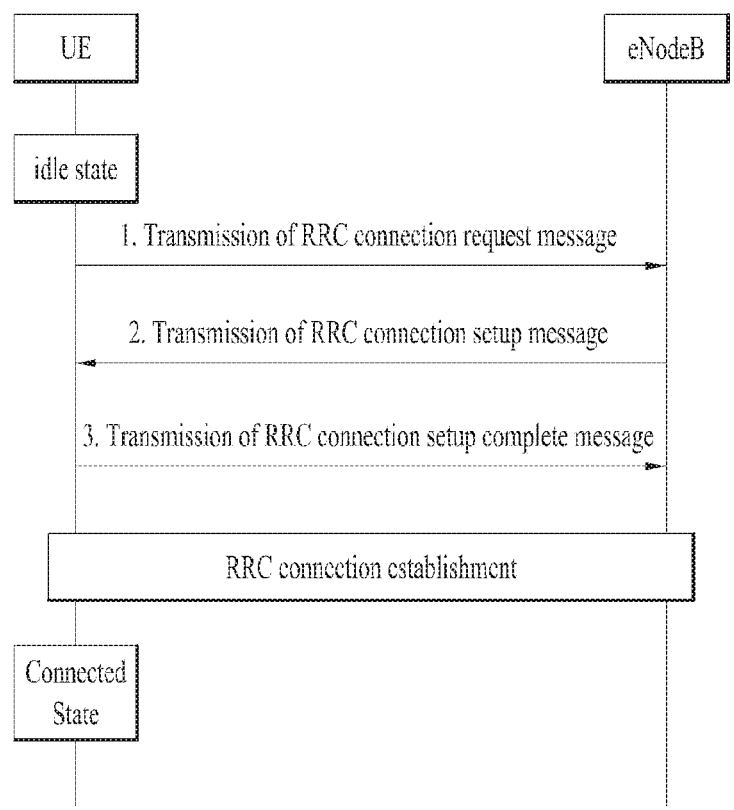
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
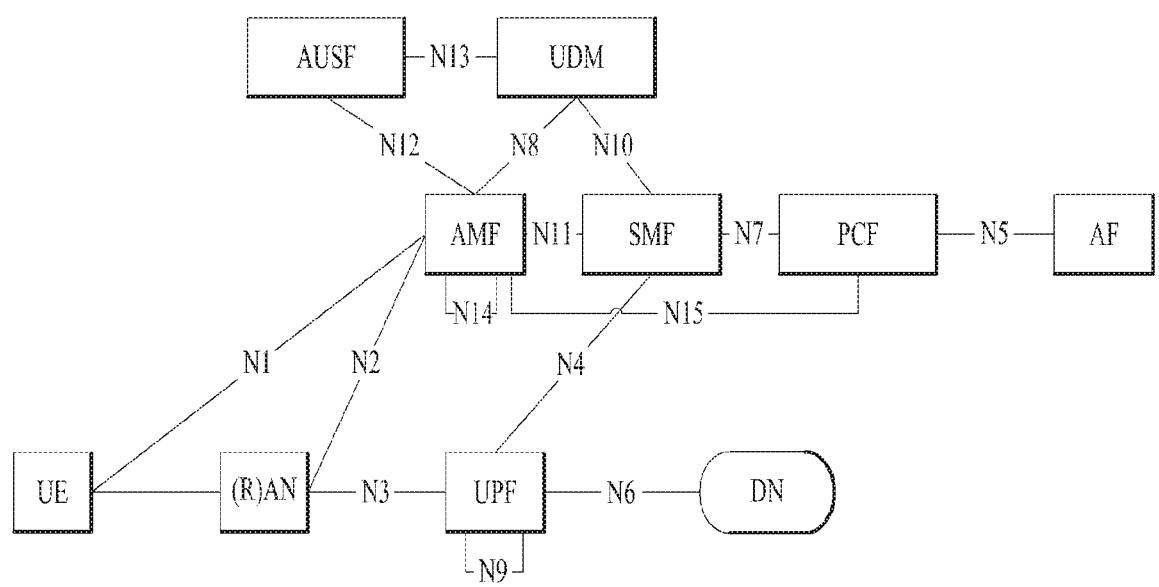
FIG. 7 is a diagram illustrating a 5$^{th}$ generation (5G) system.

MME in conventional EPC is separated into AMF (Core Access and Mobility Management Function) and SMF (Session Management Function) in the next generation system (or, 5G Core Network (CN)). Hence, NAS interaction with UE and Mobility Management (MM) are performed by the AMF and Session Management (SM) is performed by the SMF. And, the SMF manages User Plane Function (UPF) that is a gateway having a user-plane function, i.e., routing user traffic, which can be regarded as follows. First of all, in the conventional EPC, the SMF is in charge of a control-plane part of S-GW and P-GW and the UPF is in charge of a user-plane part. For the routing of user traffic, one UPF or more may exist between RAN and Data Network (DN). Namely, in 5G, the conventional EPC may be configured as exemplarily shown in FIG. 7. Moreover, as a concept corresponding to PDN connection in the conventional EPS, Protocol Data Unit (PDU) session is defined in 5G system. The PDU session means UE-to-DN association that provides a PDU connectivity service of Ethernet type or unstructured type as well as IP type. Besides, Unified Data Management (UDM) performs a function corresponding to HSS of EPC and Policy Control Function (PCF) performs a function corresponding to PCRF of EPC. Of course, to meet the requirements of the 5G system, the functions can be provided in an expanded form. TS 23.501 shall apply in details of 5G system architecture, each function and each interface.

In 3GPP Release 14, SA1 worked on service requirements to allow even a non-public safety UE to receive a network connection service via a relay UE. Wearable devices are mainly under discussion as UEs that receive the network connection service via a relay UE. The following represents the objective of WID (REAR: remote UE access via relay UE) for the work on service requirements (see SP-160511). The objective of this work item is to specify service requirements for a UE with UICC to connect to network via an Evolved ProSe UE-to-Network Relay. The Evolved ProSe UE-to-Network Relay is assumed to connect to the EPC using E-UTRAN. Regarding this, the contents of Table 2 are considered.

Figure 9:
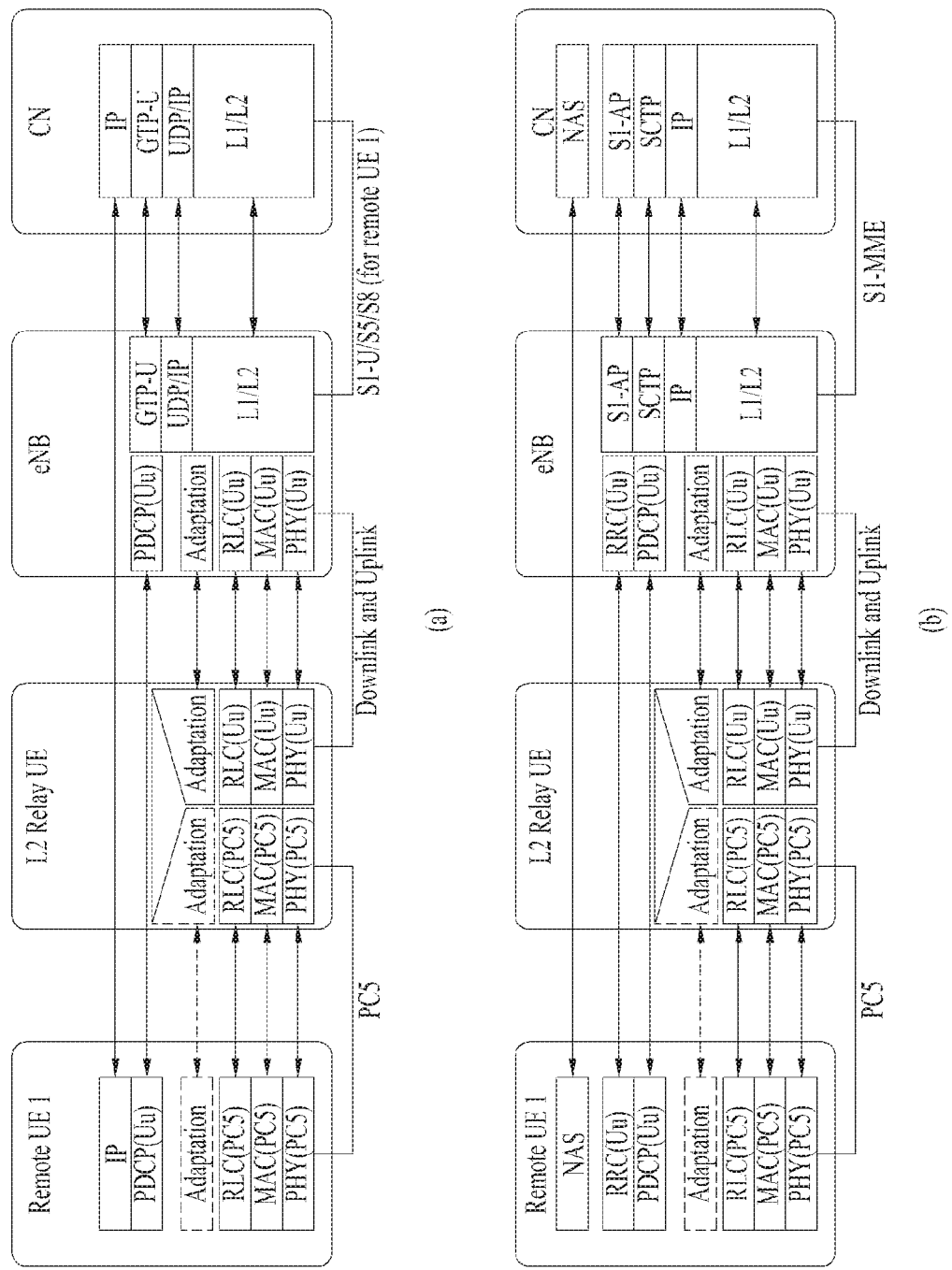
FIG. 9 and FIG. 10 are diagrams to describe a user plane protocol stack and a control plane protocol stack.
Figure 10:
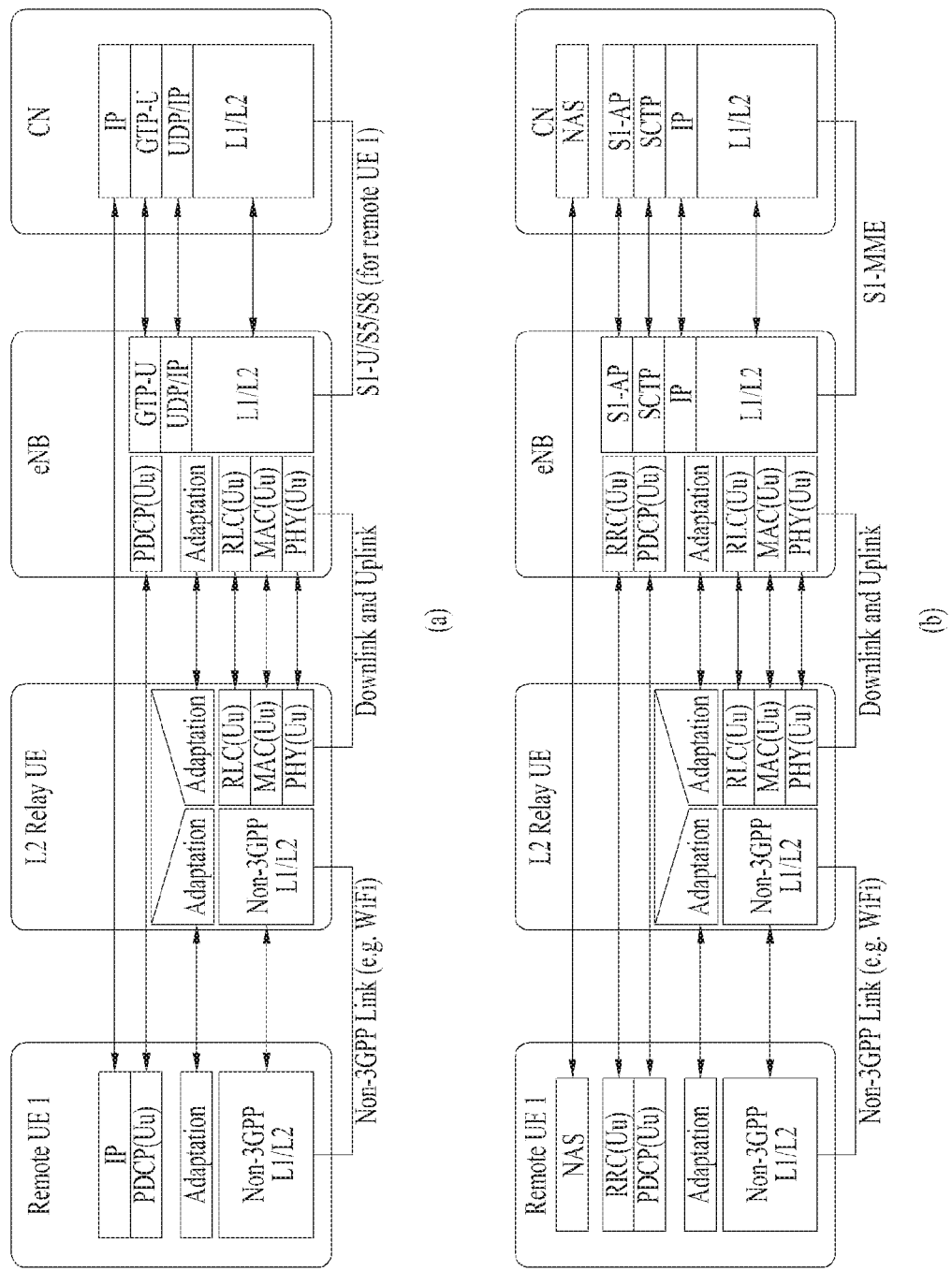

ProSe UE-to-Network Relay UE and the link between the evolved ProSe UE-to-Network Relay UE and the eNB). The user plane protocol stack and the control plane protocol stack in using PC5 between the evolved ProSe remote UE and the evolved ProSe UE-to-Network Relay UE are shown in FIG. 9 (a) and FIG. 9 (b), respectively. The user plane protocol stack and the control plane protocol stack in using non-3GPP access between the evolved ProSe remote UE and the evolved ProSe UE-to-Network Relay UE are shown in FIG. 10 (a) and FIG. 10 (b), respectively.

Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE

TABLE 2

The communication between the Evolved ProSe Remote UE and the Evolved ProSe UE-to-Network Relay to use either E-UTRA or WLAN.
The 3GPP system to support a user traffic session of an Evolved ProSe Remote UE to be relayed to the network via an Evolved ProSe UE-to-Network Relay.
Note: The Evolved ProSe Remote UE has the functionality to directly connect to the EPC without a relay.
Security related requirements for communication from the Evolved ProSe Remote UE to the EPC.
Evaluate what 3GPP services that the 3GPP system will be able to support on an Evolved ProSe Remote UE connecting through an Evolved ProSe UE-to-Network Relay including e.g. emergency calls. In addition, it is also needed to consider if the 3GPP system need to support service continuity or fallback (e.g. CS Fallback) for those services.
Service requirements regarding different ownership and different HPLMNs of the Evolved ProSe Remote UE and Evolved ProSe UE-to-Network Relay.
Basic service requirements regarding charging aspects for respective MNO subscriptions.
What roaming scenarios that the 3GPP system will support regarding roaming of an Evolved ProSe Remote UE and connecting though an available Evolved ProSe UE-to-Network Relay in the visited network or a roaming relay UE.
Service requirements regarding UE consent and/or MNO control of an Evolved ProSe Remote UE connecting through an Evolved ProSe UE-to-Network Relay.
Service requirements on QoS for the services provided to an Evolved ProSe Remote UE connected via an Evolved ProSe UE-to-Network Relay.
Service requirements regarding PLMN selection.
Lower power consumption and lower complexity aspects for the Evolved ProSe Remote UE.
Evaluate the enhancements anticipated from this WID and investigate evolving ProSe Rel 12 and Rel 13 concepts for ProSe UE-to-Network Relay to use Evolved ProSe UE-to-Network Relay.
Consideration of co-existence with ProSe Rel 12 and Rel 13 services and users including shared radio spectrum cases.
Consideration of efficient use of LTE radio spectrum (especially when shared between in-coverage and out-coverage Evolved ProSe Remote UEs).
Support QoS concepts (according to TS23.203 and TS23.401) to allow to prioritization of high priority users and services both in-coverage of cell and out-of-coverage ProSe users and UEs served by Evolved ProSe-UE-to-Network Relays.

Figure 8:
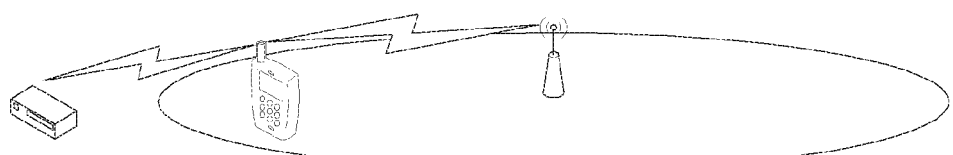
FIG. 8 is a diagram showing various scenarios of a relay.
Figure 8:
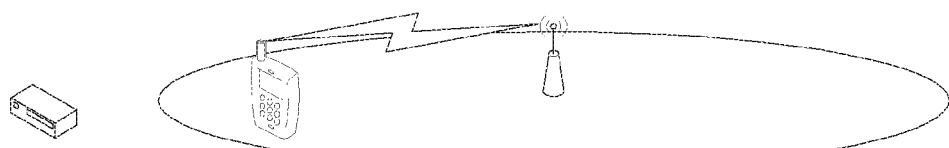
Figure 8:
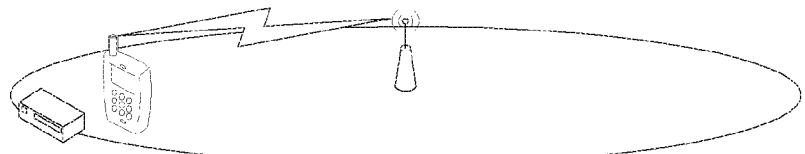
Figure 8:
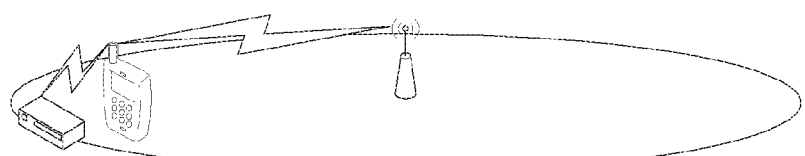

In TS 22.278, Paragraph 7B (Indirect 3GPP Communication) and Paragraph 7C (Requirements for relay UE selection for Evolved ProSe remote UE access via an Evolved ProSe UE-to-Network Relay) describe service requirements for REAR. Moreover, in TR 36.746, a solution is being developed to meet the REAR service requirements. Particularly, Paragraph 4.3 describes various scenarios as exemplarily shown in FIG. 8.

Meanwhile, according to 3GPP R2-169155, Control Plane (CP) stack and User Plane (UP) stack of Relay UE and Remote UE are defined as FIG. 9 and FIG. 10. For protocol architecture for the user plane and control plane, relaying is performed on RLC sublayer. The evolved ProSe Remote UE's user plane and control plane data are relayed on RLC via the evolved ProSe UE-to-Network Relay UE from the evolved ProSe Remote UE to network. Uu PDCP and RRC are terminated between the evolved ProSe Remote UE and the eNB while RLC, MAC and PHY and the non-3GPP transport layers are terminated in each link (i.e. including the link between the evolved ProSe Remote UE and the evolved itself onto the Uu DRB, which is used to relay traffic to/from evolved ProSe Remote UEs. Traffic mapping between a sidelink bearer and a Uu bearer depends on eNB implementation and the mapping is configured in the evolved ProSe UE-to-Network Relay UE by the eNB. An adaptation layer on Uu is supported to identify the evolved ProSe Remote UE/evolved ProSe UE-to-Network Relay UE and their responses.

Within a Uu DRB, different evolved ProSe Remote UEs and different bearers are indicated by additional information included in an adaptation layer header added to PDCP PDU. The details of this additional information can be discussed later. An adaptation layer is supported through non-3GPP access for the short range link between the evolved ProSe Remote UE and the evolved ProSe UE-to-Network Relay device. An adaptation layer header is added to the PDCP PDU.

Figure 11:
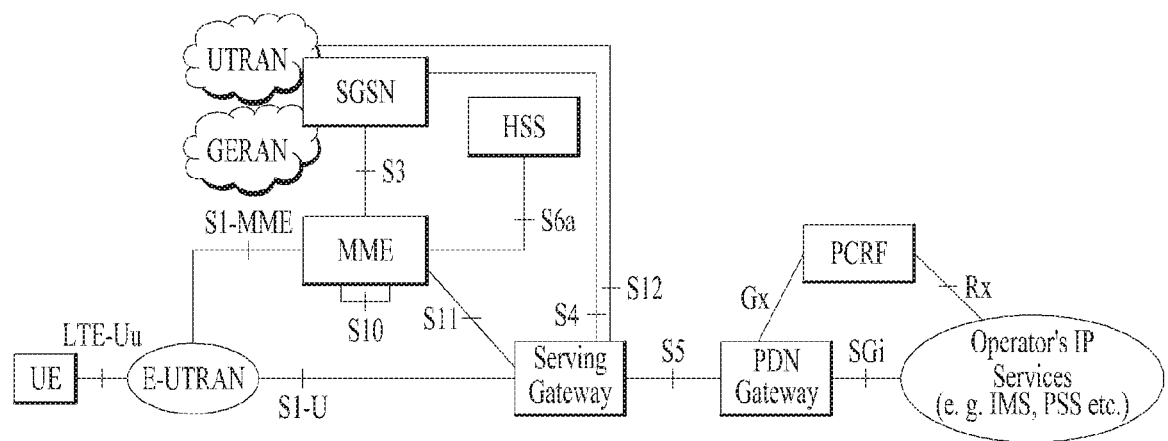
FIG. 11 shows an EPS architecture.

FIG. 11 shows EPS architecture.

Meanwhile, let's consider a case that a remote UE sends a NAS message (e.g., attach request, TAU request, service request, PDN connectivity request, etc.) to an MME via a relay UE. Such a NAS message is sent to the relay UE by the remote UE via a PC5 interface and then sent to an eNB by the relay UE via an LTE-Uu interface. If a serving MME of the remote UE is regarded as existing, the eNB sends the NAS message to the corresponding serving MME. If the serving MME of the remote UE is regarded as not existing, the eNB sends the NAS message to a serving MME selected by MME selection. In the former case, i.e., in case that the serving MME of the remote UE is regarded as existing, if a PLMN of a serving eNB of the relay UE is different from a PLMN of the serving MME of the remote UE, as there is no S1 connection between an eNB and an MME belonging to different PLMNs in general, the NAS message cannot be delivered to the MME.

To solve the above-mentioned problem, an embodiment of the present invention proposes a method of efficiently providing PLMN management for indirect communication in a mobile communication system such as 3GPP GSM/UMTS/Evolved Packet System/5G system (GSM/UMTS/EPS/5GS).

Embodiment 1

A first embodiment relates to a method for an eNB to process a PLMN related operation. Particularly, after receiving an attach request made by a remote UE, an eNB selects a PLMN identical to a serving PLMN of a relay UE as a PLMN of the remote UE based on prescribed information. If the eNB selects an MME in order to forward a NAS message sent by the remote UE to the MME, it may be regarded as selecting a PLMN. This is because Globally Unique MME Identifier (GUMMEI) is configured with PLMN ID and MME Identifier (MMEI). Here, the PLMN ID is configured with Mobile Country Code (MCC) and Mobile Network Code (MNC). Regarding GUMMEI and identifiers configuring the same, TS 23.003 is referred to.

Particularly, an eNB may receive an attach request made by a remote UE and select a serving MME of the remote UE. Here, based on at least one of identifier information of a relay UE, information indicating that the attach request the eNB relates to transmission via the relay UE, and information indicating that there is no selected PLMN information of the remote UE, the eNB may select a PLMN of the relay UE as a PLMN of the remote UE. In case of receiving an RRC message sent by the remote UE before receiving a NAS message sent by the remote UE, the received selected PLMN information of the remote UE is stored and may be then used to determine a serving MME in case of selecting an MME to which the NAS message sent by the remote UE will be forwarded.

Thereafter, the eNB may send the NAS message of the remote UE to the selected MME. Namely, in order to forward the NAS message sent by the remote UE, the serving eNB of the relay UE selects the serving MME of the remote UE and then forwards the NAS message to the selected MME.

The attach request may be forwarded to the eNB via the relay UE. Namely, the attach request may be sent to the relay UE by the remote UE, and the relay UE may send the received attach request to the eNB. In this case, information included in an attach request sent by each transmission subject may be somewhat different. When the attach request message is sent to the relay UE, the remote UE may have an IMSI value included in the message. The identifier may be included in a NAS or RRC message or PC5 signaling, which is sent by the remote UE, and/or included in a message/header (e.g., adaptation layer message/header) encapsulating it. Additionally, when the message is sent to the relay UE, the remote UE may have the selected PLMN information not included in the message or have information, which indicates that there is no selected PLMN, included in the message. The attach request message may include an attach request message of the related art or an attach request message modified to use for a network connection service via the relay UE. For the attach request message transmission (or, prior to or together with the transmission), PC5 signaling may need to be transmitted to the relay UE. And/or, for the attach request message transmission (or, prior to or together with the transmission), an RRC message may need to be transmitted to a network via the relay UE.

Subsequently, the attach request may include identifier information or the relay UE or information indicating that the attach request is transmitted via the relay UE. Particularly, if the relay UE receives the NAS or RRC message from the remote UE, when the received message is sent to the network (i.e., eNB), the identifier information of the relay UE and/or the information indicating that the attach request is transmitted via the relay UE is included in the corresponding message by the relay UE. Having the relay UE's identifier information included may be interpreted as having a GUMMEI value included in the related art RRC message or regarded as having other various identifier informations (including various identifiers such as GUTI, GUMMEI, S-TMSI, MME Code (MMEC), MME Identifier, etc.), which enable the eNB to identify the relay UE, included.

Prior to the above-described procedure, a process for the remote UE to discover the relay UE may be performed. This discovery may use Model A discovery or Model B discovery. The remote UE performs '1:1 direct link setup' with a selected relay UE. This process may be optional.

When the remote UE intends to receive the network connection service from the relay UE, the above description may apply to a case of not performing the attach procedure by being directly connected to the network previously. Here, 'when the remote UE intends to receive the network connection service from the relay UE' may be interpreted as 'during or after performing a process for the remote UE to discover the relay UE in order to receive the network connection service via the relay UE'. Besides, there may be various interpretations such as 'when an initiation condition for intending to receive the network connection service via a relay is met'. This applies to the present invention overall. The 'case of not performing the attach procedure by being directly connected to the network previously' may be interpreted as a case that the remote UE does not have the information of the serving MME (i.e., a case that there is no GUTI value provided by the MME).

Or, when the remote UE intends to receive the network connection service from the relay UE, the above description may apply to a case of performing the attach procedure by being directly connected to the network previously. The 'case of performing the attach procedure by being directly connected to the network previously' may be interpreted as a case that that the remote UE has the information of the serving MME (i.e., a case that there is a GUTI value provided by the MME). In this case, the attach request may be transmitted by the remote UE if a serving PLMN of the remote UE is different from a serving PLMN of the relay UE. Particularly, the remote UE recognizes a serving PLMN of the selected relay UE. This may be recognized through a discovery procedure. Or, if the relay UE sends a message indicating it besides the relay discovery process, such recognition can be made through the message. Or, the remote UE may consider a relay UE selection reference of selecting a relay UE served by the same PLMN as its own serving PLMN (i.e., PLMN selected when the remote UE receives a service by being directly connected to the network) in relay UE selection. Namely, with reference to the serving PLMN of the remote UE, when both a relay UE having the same serving PLMN and a relay UE having a different serving PLMN are discovered, the remote UE may consider selecting the relay UE having the same serving PLMN preferentially.

The remote UE may determine whether the serving PLMN of the remote UE is identical to the serving PLMN of the relay UE. If they are identical to each other, as there is an Si connection to the serving MME when the remote UE is serviced by being directly connected to the network, the serving eNB of the relay UE may forward the NAS message sent by the remote UE to the serving MME of the remote UE. The identifier of the remote UE and/or the selected PLMN information, which is included in the NAS message sent to the network via the relay UE, may include one of GUTI, GUMMEI, S-TMSI, MME Code (MMEC) and MME Identifier. The identifier may be included in a NAS or RRC message or PC5 signaling, which is sent by the remote UE, and/or included in a message/header (e.g., adaptation layer message/header) encapsulating it. Table 3 relates to the content of the above-mentioned identifiers and TS 23.003 applies in details thereof.

TABLE 3

<GUTI> = <GUMMEI><M-TMSI>,
   where <GUMMEI> = <MCC><MNC><MME Identifier>
   and <MME Identifier> = <MME Group ID><MME Code>
<S-TMSI> = <MMEC><M-TMSI>
Within the MME, the mobile shall be identified by the M-TMSI.

Additionally, when the message is sent to the relay UE, the remote UE may have the selected PLMN information included in the same manner of having the identifier information included. The PLMN information may be in form of 'MCC+MNC' or ECGI information of the relay UE. This applies to the present invention overall.

Moreover, the identifier information of the relay UE, which is included by the relay UE when sending the NAC message received from the remote UE to the network, may be identical/similar to the aforementioned relay UE's identifier information included when the remote UE sends the NAS message to the network via the relay UE. 'Having the relay UE' identifier included' may be interpreted as having a GUMMEI value included in the related art RRC message.

As a result from determining whether the serving PLMN of the remote UE is identical to the serving PLMN of the relay UE, if not identical, as described above, the remote UE sends an attach request message to the network via the relay UE. As described above, having received the attach request message from the relay UE, the eNB selects the same PLMN as the PLMN of the relay UE for the remote UE and then forwards the attach request message to an MME of the corresponding PLMN.

Embodiment 2

A second embodiment relates to a method of processing an operation related to a PLMN not by an eNB but by a remote UE.

Embodiment 2-1

In an embodiment 201, when a remote UE intends to receive a network connection service from a relay UE, a case of not performing an attach by being directly connected to a network previously is premised.

The remote UE discovers the relay UE. The discovery may use Model A discovery or Model B discovery. The remote UE recognizes a serving PLMN of a selected relay UE. This may be recognized through the aforementioned discovery procedure. If the relay UE sends a message indicating it besides a relay discovery process, the serving PLMN may be recognized through the message.

The remote UE selects a PLMN identical to the serving PLMN of the relay UE. This means that the remote UE selects a PLMN so that the remote UE can be directly connected to a network. The 'identical PLMN' may include an equivalent PLMN and/or a network-shared PLMN. Such information may be obtained together when the relay UE notifies its own serving PLMN information, obtained separately from the relay UE, or obtained directly from the network by the remote UE. This applies to the present invention overall.

The remote UE directly performs an attach procedure on the network via the selected PLMN. Paragraph 5.3.2.1 (E-UTRAN Initial Attach) of TS 23.401 applies in such an attach procedure. The remote UE performs '1:1 direct link setup' with a selected relay UE. This process may be optional. After the attach procedure, the remote UE transmits a NAS or RRC message to the network via the relay UE. For such transmission (or prior to or together with transmission), PC5 signaling may need to be transmitted to the relay UE.

When the message is sent to the relay UE, the remote UE has the identifier information, which is obtained from the MME through the attach procedure, included in the message. Such identifier information may include one of GUTI, GUMMEI, S-TMSI, MME Code (MMEC) and MME Identifier. The identifier may be included in a NAS or RRC message or PC5 signaling, which is sent by the remote UE, and/or included in a message/header (e.g., adaptation layer message/header) encapsulating it. Other matters about the identifiers are substituted with the former description of Table 3.

Additionally, when the message is sent to the relay UE, the remote UE may have the selected PLMN information included in the same manner of having the identifier information included. The PLMN information may be in form of 'MCC+MNC' or ECGI information of the relay UE. This applies to the present invention overall.

If the relay UE receives a message such as the aforementioned NAS message, RRC message and the like from the remote UE, when the relay UE sends the message to the network (i.e., eNB), identifier information of the relay UE or information indicating that the message is sent via the relay UE is included in the message by the relay UE. 'Having the relay UE's identifier information included' may be interpreted as 'having a GUMMEI value included in a related art RRC message or regarded as having other various identifier informations (e.g., information on the identifiers related to Table 3), which enable the eNB to identify the relay UE, included.

Once the eNB receives the NAS message sent by the remote UE via the relay UE, it sends the received message to the serving MME of the remote UE. The remote UE's serving MME information may be based on the information included in the NAS/RRC message by the remote UE. If receiving the RRC message sent by the remote UE before receiving the NAS message sent by the remote UE, the received serving MME information (e.g., information included in the NAS/RRC message) of the remote UE is stored and then used to determine a serving MME in case of sending the NAS message to the MME. Eventually, the object is to enable the serving eNB of the relay UE to forward the NAS message sent by the remote UE to the serving MME of the remote UE.

Embodiment 2-2

This embodiment premises a case that a remote UE performs an attach procedure by being directly connected to a network previously in case of intending to receive a network connection service from a relay UE.

The remote UE discovers the relay UE. The discovery may use Model A discovery or Model B discovery. The remote UE recognizes a serving PLMN of a selected relay UE. This may be recognized through the aforementioned discovery procedure. If the relay UE sends a message indicating it besides a relay discovery process, the serving PLMN may be recognized through the message.

As a relay UE selection reference considered by the remote UE, a relay UE served by a serving PLMN of the remote UE, i.e., a PLMN identical to a PLMN, which is selected when the remote UE receives a service by being directly connected to the network, is selected in a relay UE selection. Namely, when both a relay UE having a mutually identical serving PLMN and a relay UE having a mutually different serving PLMN are discovered, it is able to consider selecting the relay UE having the identical serving PLMN preferentially.

The remote UE determines whether the serving PLMN of the remote UE is identical to the serving PLMN of the relay UE. As a result of the determination, if the serving PLMN of the remote UE is identical to the serving PLMN of the relay UE, a procedure below 1:1 direct link setup mentioned in the following is performed.

If the serving PLMN of the remote UE is not identical to the serving PLMN of the relay UE, the remote UE selects a PLMN identical to the serving PLMN of the relay UE. This means that the remote UE reselects a PLMN so as to be directly connected to the network. The remote UE directly performs an attach procedure on the network via the reselected PLMN. Paragraph 5.3.2.1 (E-UTRAN Initial Attach) of TS 23.401 applies in such an attach procedure.

Subsequently, the remote UE performs '1:1 direct link setup' with the relay UE. This process may be optional. The remote UE transmits a NAS or RRC message to the network via the relay UE. For such transmission (or prior to or together with transmission), PC5 signaling may need to be transmitted to the relay UE.

When the message is sent to the relay UE, the remote UE has the identifier information, which is obtained from the attach procedure or previously obtained from the MME, included in the message. Such identifier information may include one of GUTI, GUMMEI, S-TMSI, MME Code (MMEC) and MME Identifier. The identifier may be included in a NAS or RRC message or PC5 signaling, which is sent by the remote UE, and/or included in a message/header (e.g., adaptation layer message/header) encapsulating it.

Additionally, when the message is sent to the relay UE, the remote UE may have the selected PLMN information included in the same manner of having the identifier information included. The PLMN information may be in form of 'MCC+MNC' or ECGI information of the relay UE. This applies to the present invention overall.

If the relay UE receives a message such as the aforementioned NAS message, RRC message and the like from the remote UE, when the relay UE sends the message to the network (i.e., eNB), identifier information of the relay UE or information indicating that the message is sent via the relay UE is included in the message by the relay UE. 'Having the relay UE's identifier information included' may be interpreted as 'having a GUMMEI value included in a related art RRC message or regarded as having other various identifier informations (e.g., information on the identifiers related to Table 3), which enable the eNB to identify the relay UE, included.

Once the eNB receives the NAS message sent by the remote UE via the relay UE, it sends the received message to the serving MME of the remote UE. The remote UE's serving MME information may be based on the information included in the NAS/RRC message by the remote UE. If receiving the RRC message sent by the remote UE before receiving the NAS message sent by the remote UE, the received serving MME information (e.g., information included in the NAS/RRC message) of the remote UE is stored and then used to determine a serving MME in case of sending the NAS message to the MME. Eventually, the object is to enable the serving eNB of the relay UE to forward the NAS message sent by the remote UE to the serving MME of the remote UE.

Figure 12:
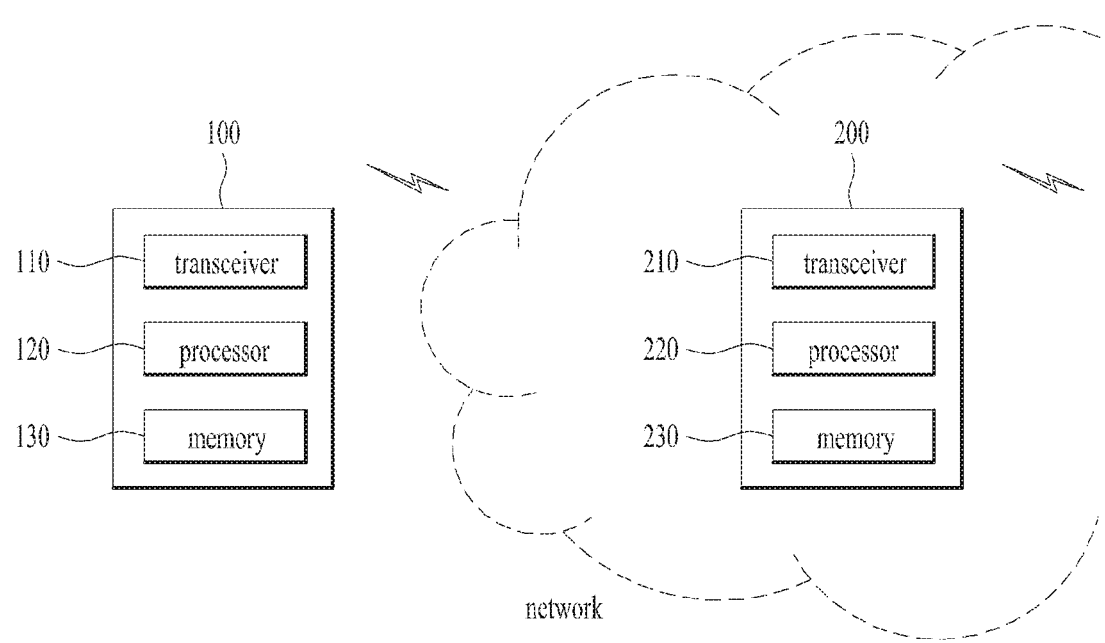
FIG. 12 is a diagram showing an example of configuration of a node device according to an embodiment of the present invention.

FIG. 12 is a diagram showing a preferred embodiment of configurations of a UE device and a network node device according to one example of the present invention.

Referring to FIG. 12, a UE device 100 according to the present invention may include a transceiver 110, a processor 120 and a memory 130. The transceiver 110 may be configured to transmit various signals, data and information to an external device and receive various signals, data and information from the external device. The UE device 100 may be connected to the external device by wire and/or wireless. The processor 120 may be configured to control overall operations of the UE device 100 and perform a function of processing an operation of information to be transceived with the external device by the UE device 100 and the like. The memory 130 may store the operation-processed information and the like for prescribed duration and be substituted with such a component as a buffer (not shown) or the like. And, the processor 120 may be configured to perform a UE operation proposed by the present invention.

Referring to FIG. 12, a network node device 200 according to the present invention may include a transceiver 210, a processor 220 and a memory 230. The transceiver 210 may be configured to transmit various signals, data and information to an external device and receive various signals, data and information from the external device. The network node device 200 may be connected to the external device by wire and/or wireless. The processor 220 may be configured to control overall operations of the network node device 200 and perform a function of processing an operation of information to be transceived with the external device by the network node device 200 and the like. The memory 230 may store the operation-processed information and the like for prescribed duration and be substituted with such a component as a buffer (not shown) or the like. And, the processor 220 may be configured to perform a network node operation proposed by the present invention. Particularly, the processor 220 may receiver an attach request of a remote UE and select a serving MME of the remote UE. The eNB may send an attach request message to the selected eNB. And, the eNB may select a PLMN of a relay UE as a PLMN of the remote UE based on at least one of identifier information of the relay UE, information indicating that the attach request is sent via the relay UE and information indicating that there is no selected PLMN information of the remote UE.

In the above-mentioned specific configurations of the UE device 100 and the network device 200, the contents or items explained in the descriptions of the various embodiments of the present invention may be independently applicable or two or more embodiments of the present invention may be simultaneously applicable. And, redundant descriptions shall be omitted from the following description for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

What is claimed is:

1. A method of selecting a serving Mobility Management Entity (MME) of a remote User Equipment (UE) and sending a Non-Access Stratum (NAS) message by an eNB in a wireless communication system, the method comprising:

receiving, by the eNB, an attach request of the remote UE;
selecting, by the eNB, the serving MME of the remote UE; and
sending, by the eNB, an attach request to the selected MME,
wherein the eNB selects a Public Land Mobile Network (PLMN) of a relay UE as a PLMN of the remote UE based on at least one of identifier information of the relay UE, information indicating that the attach request is sent via the relay UE and information indicating that there is no selected PLMN information of the remote UE.

2. The method of claim 1, wherein the attach request is forwarded to the eNB via the relay UE.

3. The method of claim 2, wherein if a serving PLMN of the remote UE is different from a serving PLMN of the relay UE, the attach request is sent by the remote UE.

4. The method of claim 3, wherein the attach request sent to the relay UE by the remote UE includes identifier information of the remote UE.

5. The method of claim 3, wherein the attach request includes the identifier information of the relay UE or the information indicating that the attach request is sent via the relay UE.

6. The method of claim 2, wherein if the remote UE does not perform an attach by being directly connected to a network previously, the attach request is sent by the remote UE.

7. An eNB device in selecting a serving Mobility Management Entity (MME) of a remote User Equipment (UE) and sending a Non-Access Stratum (NAS) message in a wireless communication system, the eNB device comprising:

a transceiver; and
a processor configured to receive an attach request of the remote UE and select the serving MME of the remote UE,
wherein the eNB sends an attach request to the selected MME and
wherein the eNB selects a PLMN of a relay UE as a PLMN of the remote UE based on at least one of identifier information of the relay UE, information indicating that the attach request is sent via the relay UE and information indicating that there is no selected PLMN information of the remote UE.

8. The eNB device of claim 7, wherein the attach request is forwarded to the eNB via the relay UE.

9. The eNB device of claim 8, wherein if a serving PLMN of the remote UE is different from a serving PLMN of the relay UE, the attach request is sent by the remote UE.

10. The eNB device of claim 9, wherein the attach request sent to the relay UE by the remote UE includes identifier information of the remote UE.

11. The eNB device of claim 9, wherein the attach request includes the identifier information of the relay UE or the information indicating that the attach request is sent via the relay UE.

12. The eNB device of claim 8, wherein if the remote UE does not perform an attach by being directly connected to a network previously, the attach request is sent by the remote UE.

* * * * *